United States Patent [19]

Osanai

[11] Patent Number: 5,062,020
[45] Date of Patent: Oct. 29, 1991

[54] RECORDING AND REPRODUCING APPARATUS

[75] Inventor: Eiji Osanai, Kanagawa, Japan

[73] Assignee: Canon Kabushiki Kaisha

[21] Appl. No.: 442,482

[22] Filed: Nov. 22, 1989

Related U.S. Application Data

[63] Continuation of Ser. No. 323,230, Mar. 13, 1989, abandoned, which is a continuation of Ser. No. 191,796, May 2, 1988, abandoned, which is a continuation of Ser. No. 838,901, Mar. 12, 1986, abandoned.

[30] Foreign Application Priority Data

| Mar. 13, 1985 | [JP] | Japan | 60-35638[U] |
| Mar. 13, 1985 | [JP] | Japan | 60-35639[U] |
| Mar. 16, 1985 | [JP] | Japan | 60-53028 |
| Mar. 20, 1985 | [JP] | Japan | 60-56188 |
| Jul. 27, 1985 | [JP] | Japan | 60-115779[U] |
| Sep. 30, 1985 | [JP] | Japan | 60-216934 |

[51] Int. Cl.⁵ .............................. G11B 17/34
[52] U.S. Cl. .................................... 360/130.34
[58] Field of Search ................... 360/130.34, 102

[56] References Cited

U.S. PATENT DOCUMENTS

| 3,155,977 | 11/1964 | Marrs | 360/102 |
| 4,466,032 | 8/1984 | Saito | 360/130.34 |
| 4,652,959 | 3/1987 | Hamada | 360/130.34 |
| 4,734,809 | 3/1988 | Inuma et al. | 360/130.34 |

FOREIGN PATENT DOCUMENTS

| 59-164967 | 11/1984 | Japan . |
| 1382371 | 1/1975 | United Kingdom . |
| 1404483 | 8/1975 | United Kingdom . |

OTHER PUBLICATIONS

Technical Report of Television Institute TEBS 100-4, p. 20, Col. 2 to p. 21, Col. 1, with translation, Matsushita Electric Co., Ltd. (Recording/Reproduction Mechanism)

Primary Examiner—Robert S. Tupper
Attorney, Agent, or Firm—Toren, McGeady & Associates

[57] ABSTRACT

A recording or reproducing apparatus has a recording or reproducing head which is radially shiftable on a flexible disc and a disc stabilizer member which is arranged to confront the head across the disc and is provided with a recessed groove formed in a shape according to the passage of the head. The stabilizer member is further provided with a positive pressure generating slant face which is located close to the recessed groove on the downstream side of the groove relative to the rotating direction of the disc. The confronting state between the disc and the head is further stabilized by virtue of the slant face.

13 Claims, 11 Drawing Sheets

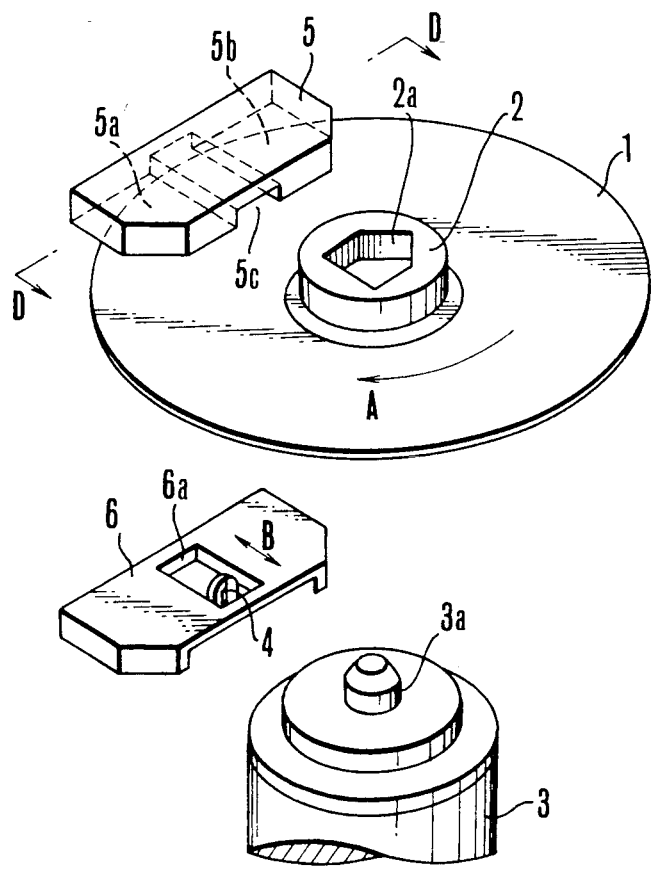
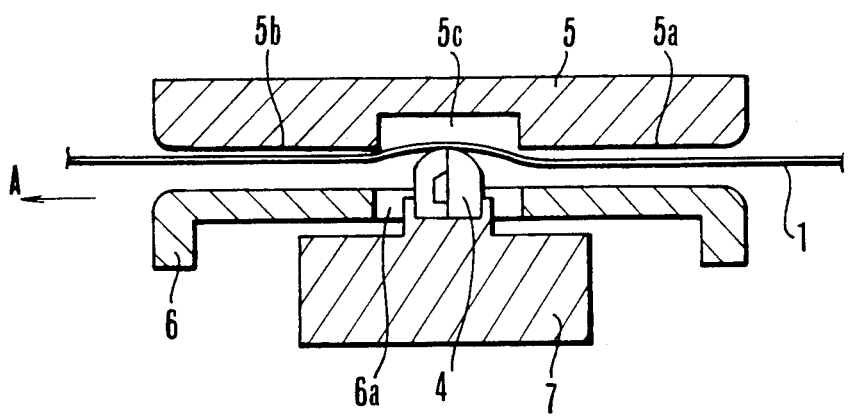

151d (152d,153d,312,314,316)

RECORDING AND REPRODUCING APPARATUS

This is a continuation application of Ser. No. 07/323,230, filed Mar. 13, 1989, which in turn is a continuation of Ser. No. 07/191,796, filed May 2, 1988, which in turn is a continuation application of Ser. No. 06/838,901, filed Mar. 12, 1986 now abandoned.

BACKGROUND OF THE INVENTION

1. Field of the Invention

This invention relates to a recording or reproducing apparatus and more particularly to an apparatus using a flexible disc as a recording medium and having a stabilizer member which is arranged to confront a recording or reproducing head across the disc for the purpose of obtaining an adequate opposed state of the disc and the head by stabilizing the portion of the disc passing by the head.

2. Description of the Prior Art

Generally, in the recording or reproducing apparatus of the above-stated kind, when a recording or reproducing head (hereinafter referred to as the head) is brought close to a disc or the recording medium rotating at a high speed, an air stream is generated by the disc rotation. Then, this air stream hinders the head and the disc from being kept in an adequately opposed state. This results in a detriorated recording or reproduction performance.

To solve this problem, it has come to be practised during recent years to have a stabilizer member opposed to the head across the disc as shown in FIG. 1 of the accompanying drawings. With the stabilizer member thus arranged on the opposite side of the disc, the rotation of the disc brings about another air stream between the disc and the stabilizer member as well as the air stream between the disc and head. It has been thus attempted to obtain an adequate opposed state between the head and the disc by virtue of the arrangement to have these air streams on both sides of the disc.

Referring to FIG. 1, the illustration includes a flexible disc 1 which is employed as a recording medium and is, for example, a magnetic disc. A center core 2 which is made of a plastic material is attached to the middle part of the disc 1. The center core 2 is provided with a center hole 2a which is arranged to be fitted on the spindle 3a of a disc rotating motor 3. With the center core thus mounted on the spindle 3a, the motor rotates, for example, in the direction of arrow A at a given speed of, say, 3,600 rpm in the case of a still picture recording or reproducing apparatus. A recording or reproducing head 4 is, for example, a magnetic head and is carried by a head carriage 7 to be shiftable radially over the disc 1 as indicated by an arrow B in FIG. 1. With the head arranged in this manner, recording tracks are formed on the recording surface of the disc 1 either in a concentrical shape or in a helical shape. A stabilizer member 5 is arranged to confront the head 4 via the disc 1 for the purpose of stabilizing the disc 1 as mentioned above. The details of the arrangement are as shown in FIG. 2. To avoid collision with the head 4, the member 5 is provided with a recessed groove 5c which is formed in a rectangular sectional shape with a fixed opening width and extends according to the moving passage of the head 4 in the direction of arrow B as shown in FIG. 1. The disc confronting surface of the stabilizer member 5 is thus divided by the groove 5c into an upstream side confronting face 5a and a downstream side confronting face 5b relative to the rotating direction A of the disc 1. A back plate 6 which is provided as necessary has a slot 6a. The slot 6a allows the head 4 to protrude toward the disc 1 through the slot.

The stabilizer member 5 is closely opposed to the upper surface of the disc 1 which is on the side opposite to the recording surface of the disc 1 as shown in FIG. 2. Meanwhile, the head 4 is arranged to have its fore end either slightly protrude inside of the recessed groove 5c of the stabilizer member 5 or flush with the above-stated disc confronting faces 5a and 5b in such a way as to be also confronting the recording surface of the disc 1. The back plate 6 is also opposed to the recording surface of the disc 1 at a distance which is greater than a distance at which the stabilizer member 5 confronts the upper surface of the disc 1.

When the disc 1 is rotated in the direction of arrow A under this condition, an air stream which is brought about between the disc 1 and the upstream side confronting face 5a of the stabilizer member 5 by the rotation of the disc 1 produces positive pressure. A portion of the disc 1 located at this part is pushed downward by the positive pressure. Meanwhile, negative pressure is produced between the disc 1 and the downstream side confronting face 5b. The negative pressure pulls the disc 1 toward the stabilizer member 5 against the rigidity of the disc. As a result, as shown in FIG. 2, the disc 1 is apt to come into contact with the downstream side confronting face 5b. Then, if the two come into contact, the opposed state between the head 4 and the disc 1 becomes unstable. Under this condition, the confronting face 5b of the stabilizer member 5 tends to be abrased by an abrasive, such as $SiO_2$, $TiO_2$ or the like, included in the binder used for the magnetic layer of the disc 1. In that event, the abrasive which is peeled off and freed from the disc 1 sticks to the flaws in the stabilizer member 5 to deteriorate thereby the surface condition of the stabilizer member 5. The deteriorated surface of the member 5 comes to impose an abnormal load on the motor 3 which is rotating the disc 1. This eventually causes an abnormal operation of the servo-mechanism of the apparatus. Furthermore, the abrasive sticking to the stabilizer member 5 accelerates the peeling off of the abrasive remaining in the binder of the magnetic layer of the disc 1. The abrasive which is thus freed from the disc 1 then comes close to the head 4 to accelerate the wear of the head. These troubles all stem from the contact brought about between the disc 1 and the stabilizer member 5 by the above-stated negative pressure.

SUMMARY OF THE INVENTION

The present invention is directed to the solution of the above-stated problem of the prior art. It is therefore an object of this invention to provide a recording or reproducing apparatus which is capable of keeping the head and the flexible disc in a stable and adequately opposed state despite of a simple arrangement and is provided with such a stabilizer member that lessens the fear and possibility of damaging the stabilizer member and the disc.

To attain this object, an embodiment of this invention is provided with a stabilizer member wherein a positive pressure generating slant face is arranged in the neighborhood of a recessed groove of the stabilizer member on the downstream side thereof relative to the rotating direction of the disc.

More specifically, the slant face is arranged such that, at a part right after the above-stated recessed groove, the slant face causes the disc to receive positive pressure and to be pushed thereby in the direction of parting from the stabilizer member, so that the disc can be prevented from coming into contact with the stabilizer member.

It is another object of this invention to provide a recording or reproducing apparatus wherein the head can be kept in a state of stably and adequately confronting the flexible disc in each of the shifted positions thereof by simple means; and a stabilizer member is arranged to lessen the fear and possibility of damaging the stabilizer member and the disc.

To attain that object, in another embodiment of this invention, the above-stated stabilizer member is provided with a recessed groove which has its opening width wider on the side the center of the disc than on the side of the periphery of the disc; and a positive pressure generating slant face which is arranged in the neighborhood of the recessed groove on the downstream side thereof relative to the rotating direction of the disc. The opposed state of the head and the disc can be improved by this arrangement at each of the shifted positions of the head and, at the same time, the disc is pushed away from the stabilizer member by positive pressure produced by the slant face at a point right after the recessed groove, so that the disc can be effectively prevented from coming into contact with the stabilizer member.

It is a further object of this invention to provide means for solving the above-stated problem of the recording or reproducing apparatus of the kind having a stabilizer member by preventing the negative pressure from being produced between the stabilizer member and the flexible recording medium while the medium is rotating and by preventing uneven rotation of the medium or disc caused by the contact of the medium with the stabilizer member, so that the sliding contact of the head with the medium can be stabilized.

To attain the above-stated object, a recording or reproducing apparatus which embodies this invention and is provided with a stabilizer member for stabilizing the rotating motion of a flexible record bearing medium is arranged as follows: The stabilizer member or plate is provided with a recessed part which is formed in the middle part of the stabilizer plate for escaping a recording or reproducing head and is in such a shape as to keep the recessed part under pressure approximately equal to ambient pressure while the medium is rotating; at least one recessed part which is disposed on the downstream side of the middle recessed part in the middle part relative to the medium rotating direction and is formed in such a shape as to remain under pressure approximately equal to the ambient pressure while the medium is rotating; and a protrudent part which is divided by these middle and downstream recessed parts and is formed in such a shape that is capable of producing positive pressure between the protrudent part and the record bearing medium while the medium is rotating. In this embodiment, in addition to the middle recessed part which is provided for escaping the head, the stabilizer member is provided with the downstream recessed part. However, if necessary, another recessed part may be arranged on the upstream side of the middle recessed part. Meanwhile, the protrudent part must be located in a position to be divided and defined by the middle and downstream recessed parts. In the event of a plurality of such protrudent parts, at least one of them is preferably arranged to have its face which confronts the record bearing medium slantingly formed. If necessary, some protrudent part or parts may be divided and defined by recessed parts on the upstream side of the middle recessed part. In that event, it is preferable to have all of or a part of these upstream protrudent parts also arranged to confront the medium with slanting faces of them.

With the embodiment arranged in the above-stated manner, the middle and down stream recessed parts are kept under pressure which is approximately equal to the ambient pressure while the record bearing medium is rotating Further, under that condition, positive pressure is produced between the protrudent part and the medium while negative pressure can be prevented from being generated by virtue of these recessed and protrudent parts. Therefore, the recording (or record bearing) medium is pushed downward away from the stabilizer member (or plate) during its rotation both on the upstream and downstream sides of the sliding contact position between the medium and the recording or reproducing head and thus can be kept in an approximately symmetrical condition.

In other words, since the head is thrusted forward, the medium or disc is deformed into a curved state. Therefore, in order to generate positive pressure on the downstream side of the head, positive pressure generating faces must be arranged in accordance with each point of this deformed shape of the disc. However, if these positive pressure generating faces are arranged in a continuing manner, negative pressure would be produced at the continuing part. Whereas, in the case of this embodiment, each part which corresponds to this continuing part is arranged to be in the form of a recessed part and thus to have pressure approximately equal to the ambient pressure, so that the above-stated problem can be solved by the embodiment.

It is a further object of this invention to provide means for solving the above-stated problem of the recording or reproducing apparatus of the kind having a stabilizer member by preventing the negative pressure from being produced between the stabilizer member and the flexible recording medium while the medium or disc is rotating and by preventing uneven rotation of the medium caused by the contact of the medium with the stabilizer member, so that the sliding contact of the head with the medium can be stabilized at every shifted position of the head.

To attain that object, a recording or reproducing apparatus embodying this invention and provided with a stabilizer member for stabilizing the rotating motion of a flexible record bearing medium is arranged as follows: The stabilizer plate is provided with a recessed part which is formed in the middle part of the stabilizer plate for avoiding collision with a recording or reproducing head. The middle recessed part has a wider opening width on the side of the rotation center of the recording medium than on the peripheral side of the medium and is in such a shape as to keep the recessed part under pressure approsimately equal to ambient pressure while the medium is rotating. The stabilizer plate is further provided with at least one recessed part which is disposed on the downstream side of the above-stated middle recessed part relative to the rotating direction of the medium and is formed in such a shape as to remain under pressure approximately equal to the ambient pressure while the medium is rotating; and a protrudent part which is divided by these middle and downstream recessed parts and is formed in such a shape that is capable of producing positive pressure between the protrudent part and the record bearing medium while the medium is rotating. In this embodiment, the stabilizer member is provided with the downstream recessed part in addition to the middle recessed part which is provided for the purpose of avoiding collision with the head. If necessary, however, some protrudent parts may be arranged also on the upstream side to be divided by recessed parts. In that event, either all of or some of these upstream side protruding parts preferably have their medium confronting faces formed aslant.

In the arrangement described, the middle recessed part of the stabilizer plate which is provided for the purpose of avoiding collision with the head is formed in accordance with the shape of deformeation expected to be caused by the protrudent state of the head during the rotation of the record bearing medium. Therefore, the sliding contact state between the head and the medium at each of the shifted positions of the head can be improved. Further, under the medium rotating condition, the middle and downstream recessed parts of the stabilizer plate are kept under such pressure that is approximately equal to the ambient pressure. Meanwhile, between the confronting faces of the above-stated protrudent part and the record bearing medium is generated positive pressure. Besides, no negative pressure will be generated both at the recessed parts and at the protrudent part under the medium rotating condition.

During its rotation, therefore, the record bearing medium is pushed away from the stabilizer plate both on the upstream and downstream sides of a part at which the sliding contact of it takes place with the recording or reproducing head and is kept in an approximately symmetrically deformed shape relative to that part. In other words, the deformation of the disc caused by the protrudent state of the head takes place in a curved shape. Therefore, in order to have the desired positive pressure on the downstream side of the head, a positive pressure generating face must be arranged according to every point of this deformed shape. However, if positive pressure generating faces are continuously formed, negative pressure would be generated at the continuing part between them. Whereas, in accordance with the arrangement of this embodiment, the part which corresponds to such continuing part is arranged in the form of a recessed part which will have about the same pressure as the ambient pressure, so that the above-stated problem can be solved by the embodiment.

It is a further object of this invention to provide a recording or reproducing apparatus which is of the kind having a stabilizer plate for stabilizing the rotating motion of a flexible record bearing medium and is arranged to include means for stabilizing further the sliding contact of the medium with a recording or reproducing head by virtue of arrangement wherein: A recessed part which is provided approximately in the middle part of the stabilizer plate for avoiding collision with the recording or reproducing head is formed into such a shape that keeps the recessed part under about the same pressure as the ambient pressure while the medium is rotating; at least one protrudent part is formed on the stabilizer plate on the downstream side of the middle recessed part relative to the rotating direction of the medium and is arranged to have a slant face which gradually approaches the medium and to be capable of generating sufficiently great positive pressure between it and the flexible record bearing medium when the latter rotates.

To attain the above-stated object, a recording or reproducing apparatus embodying this invention stabilizes the rotating motion of a flexible record bearing medium with a stabilizer plate which is arranged as follows: The plate is provided with a recessed part which is formed in the middle part of the plate for avoiding collision with a recording or reproducing head. The middle recessed part is formed in such a shape as to keep this part under pressure approximately equal to ambient pressure while the medium is rotating. The stabilizer plate is further provided with at least one protrudent part which is located on the downstream side of the middle recessed part relative to the rotating direction of the medium. This protrudent part has a slant face which gradually approaches the medium in the downstream direction. A projection is formed at one end of the slant face which is located closest to the medium. The stabilizer plate is preferably provided with a plurality of such protrudent parts on the downstream side in the rotating direction of the record bearing medium and are arranged to be divided by Some recessed parts. Each of these recessed parts is preferably formed in a shape sufficient for keeping that part under about the same pressure as the ambient pressure in the same manner as the middle recessed part. It is also preferable to have at least one protrudent part arranged on the upstream side of the rotating direction of the record bearing medium in the same manner as on the downstream side. In that case, the upstream protrudent part is provided with a slant face which gradually comes closer to the medium in the direction of the middle recessed part and preferably has a projection formed to protrude toward the medium at its one end on the side of the middle recessed part.

With the embodiment arranged as described above, when the flexible record bearing medium is rotating, the recessed part which is provided in the middle part of the stabilizer plate is kept under about the same pressure as the ambient pressure. The protrudent part which is disposed on the downstream side of the middle recessed part is provided with the slant face. The slant face gradually approaches the record bearing medium in the downstream direction. A projection is formed at the end of this slant face which is the closest to the medium. With the slant face having this projection, it produces greater positive pressure between it and the medium than a slant face which is not provided with such a projection. During its rotation, therefore, the record bearing medium is pushed downward away from the stabilizer plate on both the upstream and downstream sides of a point at which it comes into sliding contact with the recording or reproducing head. The deformation of the medium due to the contact with the head is thus can be kept in an approximately symmetrical shape.

Further, to attain the above-stated object, another embodiment of this invention comprises a recording or reproducing head which is shiftable radially over a flexible record bearing medium; and a stabilizer member having a recessed groove formed therein to confront the head across the medium is provided with a positive pressure generating slant face which is disposed close to the recessed groove on the downstream side thereof in the rotating direction of the medium and is arranged to have its slanting angle vary in the shifting direction of the head.

In the embodiment described, as mentioned above, the stabilizer member is provided with the positive pressure generating slant face which is disposed close to the recessed groove part on the downstream side of the groove part in the rotating direction of the medium and is arranged to have its slanting angle vary in the shifting direction of the head. This arrangement ensures approximately uniform distribution of the positive pressure which is generated between the slant face and the record bearing medium according to the shape of deformation of the medium when the medium rotates at a high speed. The uniform positive pressure distribution is obtainable throughout the whole shifting passage of the head and the generated pressure seldom drops on the inner side of the medium.

These and further objects and features of this invention will become apparent from the following detailed description of preferred embodiments thereof taken in connection with the accompanying drawings.

BRIEF DESCRIPTION OF THE DRAWINGS

FIG. 1 is an oblique view showing in outline the arrangement of essential parts of a recording or reproducing apparatus related to this invetnion with a known flexible disc which is to be used by the apparatus.

FIG. 2 is a sectional view taken on line D-D of FIG. 1 showing the disc as in a rotating state.

DETAILED DESCRIPTION OF THE PREFERRED EMBODIMENTS

Figure 3:
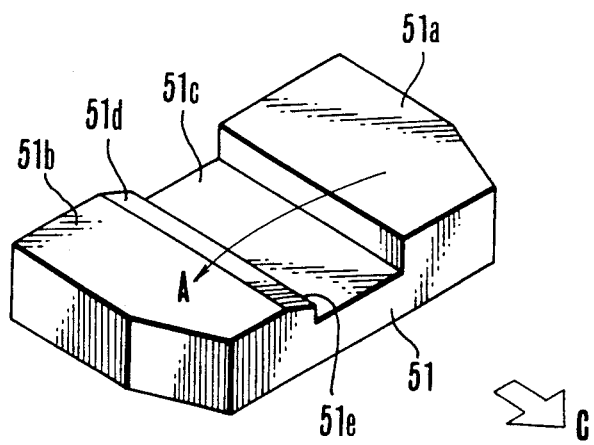
FIG. 3 is an oblique view of a stabilizer member employed in a first embodiment of this invention showing it as viewed from its disc confronting side.
Figure 4:
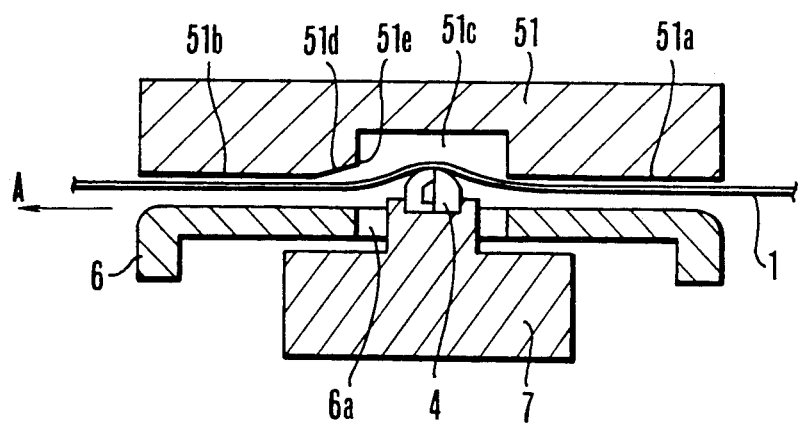
FIG. 4 is a sectional view similar to FIG. 2 showing the stabilizer member of FIG. 3 as used in the arrangement of FIG. 1.

Preferred embodiments of this invention are arranged as described below:

FIG. 3 shows a stabilizer member employed in a first embodiment of this invention showing in particular the disc confronting face of the member. FIG. 4 shows the stabilizer member as in a state of being set in position in the apparatus. Referring to these drawings, a disc 1 is arranged to rotate in the direction of arrow A while another arrow C indicates the direction in which a center core 2 is located.

The stabilizer member 51 is provided with a recessed groove part 51c for escaping from a head 4. The disc contronting face 51a of the member 51 on the upstream side of the groove part 51c relative to the rotating direction of the disc 1 is arranged in the same manner as in the case of the prior art described in the foregoing. Whereas, the disc confronting face 51b of the member 51 on the downstream side of the groove part 51c is provided with a positive pressure generating slant face 51d which is formed along the edge 51e of the groove part 51c on the downstream side thereof. The slant face 51d is formed at such a given acute angle to a portion of the disc passing there that positive pressure can be generated between the slant face 51d and the passing portion of the disc when the disc rotates in the direction of arrow A in a manner as shown in FIG. 4. In other words, the slant face is formed to be at a given acute angle determined on the basis of the deformation shapes of the disc portion passing there in such a way as to give a required amount of positive pressure at a given rotating speed of the disc 1.

With the stabilizer member 51 arranged in this manner, the slant face 51d produces positive pressure when the disc 1 rotates as shown in FIG. 4. At this part, therefore, the disc 1 is pushed by this pressure downward away from the downstream side confronting face 51b of the stabilizer member. Therefore, this arrangement precludes the possibility of having the disc 1 come into contact with the downstream side confronting face 51b. In this instance, the positive pressure acts on the disc 1 at a part thereof near a part where the deformation of the disc 1 due to the protrudent state of the head reaches a maximum degree, so that the disc 1 can be most effectively prevented from coming into contact with the member 51.

Further, in this instance, the positive pressure obtained by virtue of the slant face 51d is sufficiently great. Therefore, even if the disc 1 is pushed at this part further downward than the standard rotation plane (the horizontal plane of the disc as shown in FIG. 4), the disc 1 is substantially at an acute angle to the downstream side confronting face 51b which is virtually in parallel with this standard rotation plane when the disc 1 comes back to the standard rotation plane after passing this slant face 51d. Therefore, a considerable amount of positive pressure is obtained also at that part to prevent further the disc 1 from coming into contact with the downstream confronting face 51b. This also serves to ensure a further improved confronting state between the head 4 and the disc 1.

Figure 5:
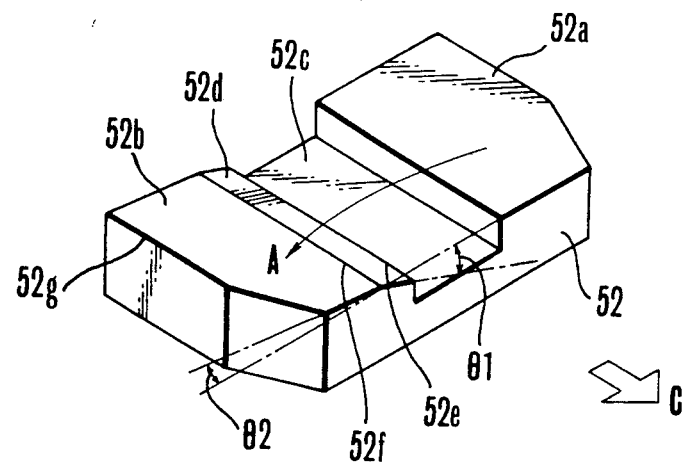
FIG. 5 is an oblique view of a stabilizer member employed in a second embodiment of this invention showing it as viewed from its disc confronting side.
Figure 6:
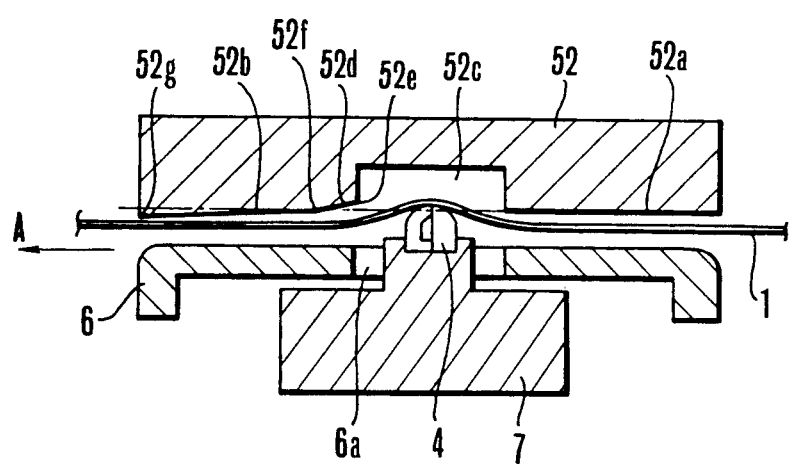
FIG. 6 is a sectional view similar to FIG. 2 showing the stabilizer member of FIG. 5 as in a state of being used in the arrangement shown in FIG. 1.

FIGS. 5 and 6 show a second embodiment of this invention. In this case, the stabilizer member is arranged to actively obtain positive pressure not only at the above-stated positive pressure generating slant face but also at the downstream side confronting face. Referring to FIGS. 5 and 6, the stabilizer member is provided with a downstream side confronting face 52b which is formed to serve as a second positive pressure generating slant face following a positive pressure generating slant face 52d. Compared with the part of the disc 1 confronting the slant face 52d, the part of the disc 1 confronting the downstream side confronting face 52b has come closer to the standard rotation plane of the disc 1. Therefore, the slanting angle of the downstream side confronting face 52b which serves as the second positive pressure generating slant face is arranged to have a smaller slanting angle. In other words, assuming that the upstream side confronting face 52a which is virtually in parallel with the standard rotation plane of the disc 1 is a datum plane and that the downstream side confronting face 52b is at an angle $\theta 2$ to the upstream side confronting face 52a, the angle $\theta 2$ is smaller than an angle $\theta 1$ formed between the upstream side confronting face 52a and the downstream side slant face 52d as shown in FIGS. 5 and 6.

Referring further to FIGS. 5 and 6, a connecting line 52f between the slant face 52d and the downstream side confronting face 52b may be arranged to be on the same level as the upstream side confronting face 52a and the downstream side confronting face 52b may be arranged to come further downward from the level of the line 52f according to the inclination thereof as shown in these drawings. Or, the end 52g of the downstream side confronting face 52b may be arranged to be on the same level as the upstream side confronting face 52a. The stabilizer member is provided with a recessed groove part 52c for escaping from the head 4. A reference numeral 52e denotes the edge of the groove part 52c on the downstream side thereof. A numeral 52 denotes the whole stabilizer member.

Figure 7:
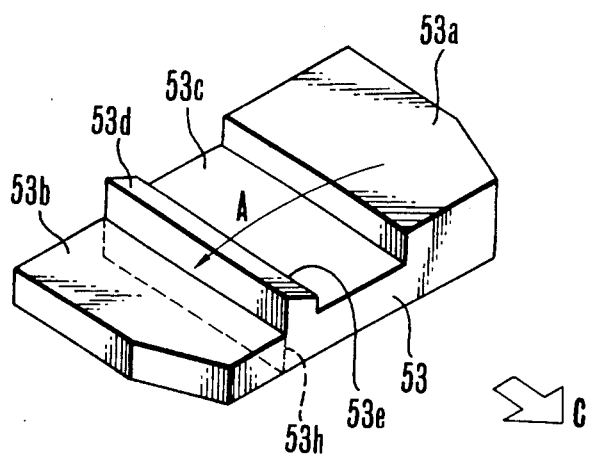
FIG. 7 is an oblique view of a stabilizer member employed in third and fourth embodiments of this invention showing it as viewed from its disc confronting side.

FIG. 7 shows a third embodiment of this invention. This embodiment applies to a case where the disc 1 can be sufficiently stabilized solely by means of the above-stated positive pressure generating slant face. In this case, as shown in FIG. 7, a downstream side confronting face 53b which follows a positive pressure generating slant face 53d is located sufficiently away from the disc 1 to ensure that this part is under the same pressure as ambient pressure. This arrangement completely precludes the possibility of having the disc 1 come into contact with the downstream side confronting face 53b. In a modification (a fourth embodiment) of this embodiment, the part of the stabilizer member 53 corresponding to this confronting face 53b is cut off as indicated by a broken line in FIG. 7 and the member 53 is allowed to have only the positive pressure generating slant face 53d on the downstream side of a recessed groove part 53c. Referring further to FIG. 7, a reference numeral 53a denotes an upstream side confronting face; and a numeral 53e the edge of the recessed groove part 53c on the downstream side thereof.

In accordance with the arrangement of the third and fourth embodiments described above, the confronting state between the head and the flexible disc can be kept in a stable and adequate state by simple means. Besides, the possibility of damage of the stabilizer member and the disc can be lessened to a great degree. This is a great advantage for a recording or reproducing apparatus of the kind using a flexible disc as a recording medium.

Figure 8:
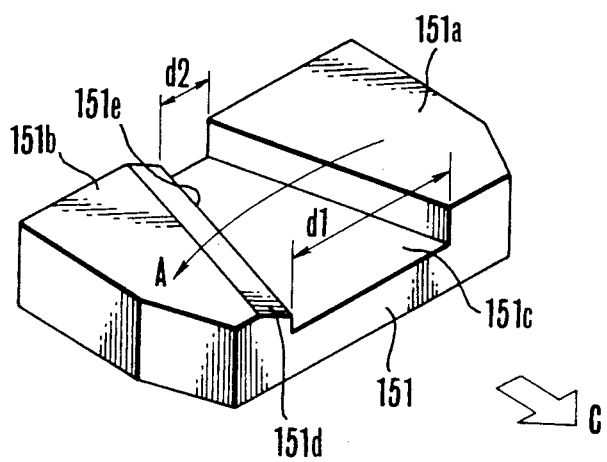
FIG. 8 is an oblique view of a stabilizer member employed in a fifth embodiment of this invention showing it as viewed from its disc confronting side.
Figure 9:
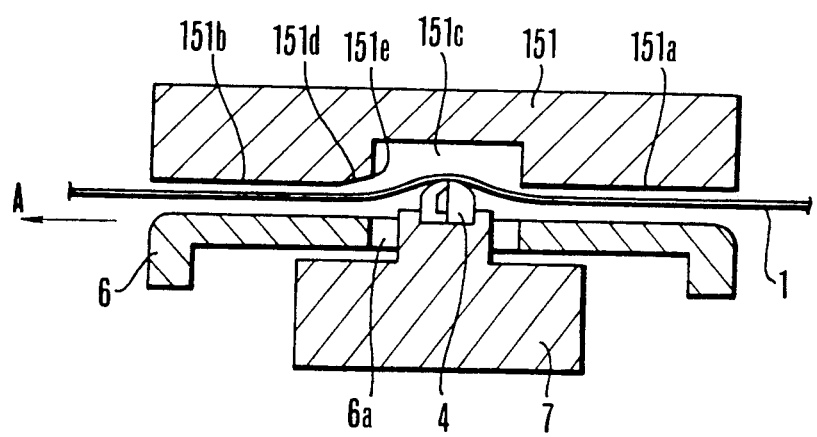
FIG. 9 is a sectional view showing the stabilizer member of FIG. 8 as in a state of being used in the arrangement shown in FIG. 1.
Figure 10A:
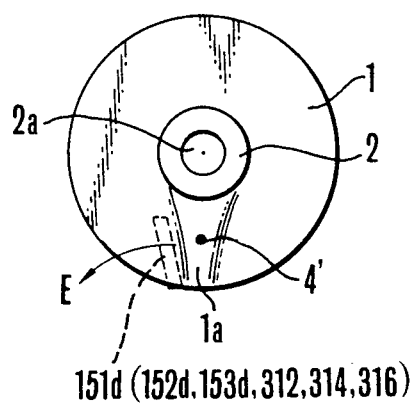
FIGS. 10A and 10B show in a plan view and an oblique view the deformation of the disc caused by the thrust state of a head.

A fifth embodiment of this invention is arranged as shown in FIGS. 8 and 9. FIG. 8 shows in an oblique view the stabilizer member of the fifth embodiment and FIG. 9 the same member as in a state of being arranged within the apparatus. An arrow A indicates the rotating direction of the disc 1 and another arrow C the direction in which the center core 2 of the disc 1 is located. Before describing the fifth embodiment, the manner in which the disc 1 is deformed by the protrudent state of the head 4 will be first described with reference to FIGS. 10A and 10B as follows:

The deformation of the disc 1 due to the thrusting state of the head 4 extends between the center core 2 and the circuference of the disc 1. The width of the deformation is wider on the side of rotation center of the disc 1 because of the influence of the center core 2 and becomes narrower in the radial direction of the disc toward the circumference. Referring to FIG. 10A, a numeral 4' denotes the position of the head 4 causing the deformation (approximately corresponds to the center of a recording area). The deformation spreads always in the above-stated manner irrespective of the radial position of the head 4.

Figure 10B:
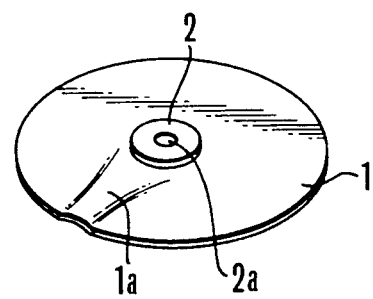

In the case of a disc which will be deformed into a shape 1a by the head 4 as shown in FIGS. 10A and 10B, the confronting state between the head and the disc cannot be always adequately stabilized by the use of the stabilizer member 5 of FIGS. 1 and 2 which has the recessed groove part arranged to have an unvarying opening width, though it depends on the radial position of the head 4 relative to the disc 1. This problem is likely presented not only by the flexible magnetic disc having a center core but also by, for example, a flexible magnetic disc of the kind having no center core if arranged to be rotated by an apparatus which is provided with a clamper for clamping the middle part of the disc to a disc rotating spindle. For example, the apparatuses of that type include a floppy disc driving apparatus.

To solve this problem, therefore, the fifth embodiment is provided with a stabilizer member 151 which is arranged as shown in FIG. 8. The member 151 has a head escaping recessed groove part 151c arranged to have a wider opening width d1 on the disc center side than an opening width d2 on the peripheral side of the disc 1 according to the deformation shape 1a of the disc mentioned above. In addition to this, of upstream and downstream disc confronting faces 151a and 151b divided by the recessed groove part 151c in the rotating direction of the disc 1, the downstream side confronting face 151b is provided with a positive pressure generating slant face 151d which is formed close to the recessed groove part 151c, i.e. along the edge 151e of the part 151c on the downstream side thereof. To have positive pressure generated to a required degree between the slant face 151d and a portion of the disc 1 passing by there while the disc rotates in the direction of arrow A, the slant face 151d is arranged to be at a suitable acute angle of inclination relative to the passing disc portion in accordance with the deformation shape of the disc to be obtained there.

With the stabilizer member 151 arranged in this manner, an approximately uniform air flow is obtained between the stabilizer member 151 and the disc 1 throughout the whole area there because of the shape of the head escaping recessed groove part 151c which is formed approximately in accordance with the shape 1a of the deformation of the disc 1 caused by the protrudent state of the head 4. Then, the uniform air flow or stream ensures an adequate confronting condition between the disc 1 and the head 4 at every shifted position of the head 4. In addition to that advantage, the positive pressure which is generated by the slant face 151d during the rotation of the disc 1 serves to push the disc 1 downward as viewed on FIG. 9, so that the disc 1 can be kept away from the downstream side confronting face 151b. This contributes to the stabilization of the motion of the disc 1 at the head 4 for further improvement in the recording or reproducing performance of the apparatus. Further, as will be understood from the illustration of FIGS. 9 and 10, the positive pressure obtained by means of the slant face 151d acts on the disc 1 at a point right after the head 4 passes the recessed groove part 151c, i.e. at a part where the disc 1 is deformed to a maximum degree by the protrudent state of the head 4. That arrangement, therefore, further effectively prevents the disc 1 from coming into contact with the stabilizer member 151. Further, in this case, the slant face 151d is provided along the edge 151e on the downstream side of the recessed groove part 151c as mentioned above. Therefore, the position of this slant face 151d relative to the disc 1 becomes as shown by a broken line in FIG. 10A. Meanwhile, the air stream which is generated by the rotation of the disc 1 centrifugally increases from the tangential direction toward the outside of the disc 1 as indicated by an arrow E. The slant face 151d is in an orthogonal relation to the direction E of this air stream. The slant face 151d is therefore capable of efficiently generating the positive pressure.

Further, in this case, even if this portion of the disc 1 is pushed down to a lower plane than the standard rotation plane (a horizontal plane shown in FIG. 9) of the disc by the sufficient magnitude of the positive pressure obtained by the slant face 151d, the disc 1 substantially forms an acute angle in the direction of arrow A relative to the downstream side confronting face 151b which is virtually in parallel with the standard rotation plane, after the disc 1 passes the slant face 151d. This substantial acute angle then gives positive pressure also at this part, so that the disc 1 can be further effectively prevented from coming into contact with the downstream side confronting face 151b. This further contributes to the improvement in the confronting condition between the head 4 and the disc 1.

Figure 11:
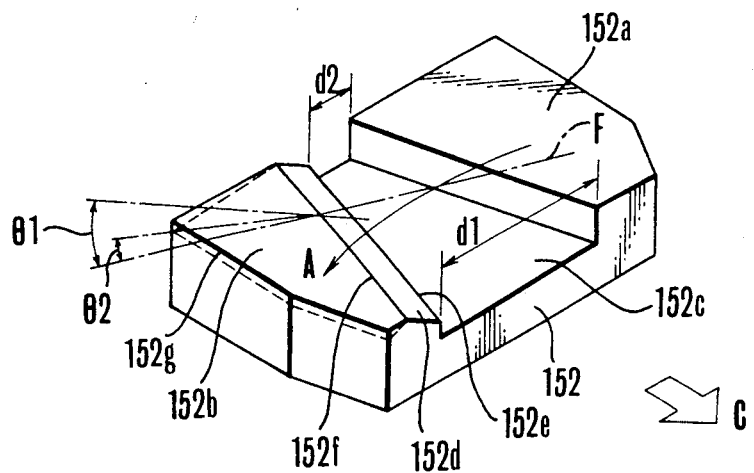
FIG. 11 is an oblique view of a stabilizer member employed in a sixth embodiment of this invention showing it as viewed from its disc confronting side.

A sixth embodiment of this invention is arranged as described below:

In case that the positive pressure is desired to be more actively obtainable also over the downstream side confronting face following the above-stated positive pressure generating slant face, the downstream side confronting face 152b can be formed into a second positive pressure generating slant face which follows the positive pressure generating slant face 152d as shown in FIG. 11. In this instance, as apparent from FIG. 9, the disc portion confronting the downstream side confronting face 152b is closer to the standard rotation plane than the disc portion confronting the slant face 152d. Therefore, the angle of inclination of the former disc portion is smaller than that of the slant face 152d. In other words, as shown in FIG. 11, with the upstream side confronting face 152a of the stabilizer member 152 assumed to be a datum plane as it is virtually in parallel with the standard rotation plane of the disc 1, the downstream side confronting face 152b is at an angle $\theta 2$ to the upstream side confronting face 152a. The angle $\theta 2$ is smaller than an angle $\theta 1$ which is formed by the downstream side slant face 152d relative to the upstream side confronting face 152a. In FIG. 11, a reference symbol F denotes a line segment which extends from the upstream side confronting face 152a to orthogonally intersect a connection line 152f between the slant face 152d and the downstream side confronting face 152b.

Further, in this case, the connecting line 152f between the slant face 152d and the downstream side confronting face 152b may be arranged to be on the same level as the upstream side confronting face 152a and the downstream side confronting face 152b may be arranged to extend further downward according to its inclination as shown in FIG. 11. It is also possible to have the end part 152g of the downstream side confronting face 152b arranged on the same level as the upstream side confronting face 152a. The stabilizer member is provided with a head escaping recessed groove part 152c. A reference numeral 152e denotes the edge on the downstream side of the recessed groove part 152c; and a numeral 152 denotes the whole stabilizer member.

Figure 12:
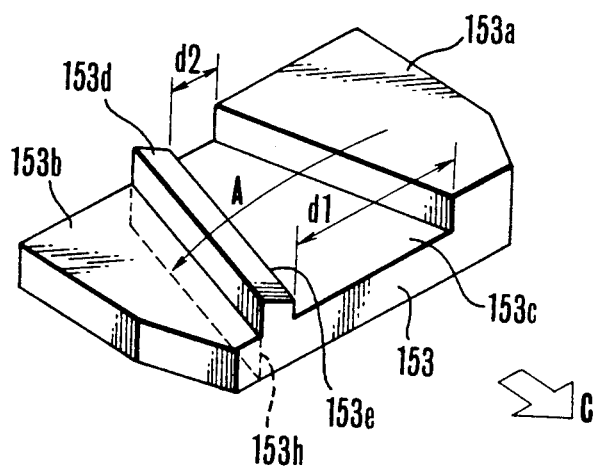
FIG. 12 is an oblique view of a stabilizer member employed in seventh and eighth embodiments of this invention showing it as viewed from its disc confronting side.

A seventh embodiment of this invention applies to a case where the disc 1 can be adequately stabilized with the stabilizer member provided solely with the above-stated positive pressure generating slant face. In this case, as shown in FIG. 12, a downstream side confronting face 153b which continues from a positive pressure generating slant face 153d is arranged to be sufficiently away from the disc 1 to have this part under the same pressure as ambient pressure. This arrangement completely eliminates the possibility of having the disc 1 come into contact with the downstream side confronting face 153b. In an eighth embodiment which furthers the arrangement of the seventh embodiment, the part corresponding to the downstream side confronting face 153b is cut off as indicated by a broken line. Therefore, in that instance, the stabilizer member 153 is provided solely with the positive pressure generating slant face 153d on the downstream side of the recessed groove part 153c. In FIG. 12, a reference numeral 153a denotes the upstream side confronting face; a numeral 153e the edge of the recessed groove part 153c on the downstream side of the groove part; and a numeral 153 the whole stabilizer member.

In the embodiments given in the foregoing, the shape of tho recessed groove parts 151c, 152c and 153c may be determined on the basis of the shape of deformation of the disc 1 obtained with the head 4 positioned at about the middle part 4' of the recording area on the disc 1. It is also possible to determine the shape of the recessed groove part on the basis of the average of the deformation shapes of the disc 1 obtained at various shifted positions of the head 4. As for the depth of the groove, it may be determined as desired within a range of depths at which the ambient pressure is obtainable there. While the groove is arranged to be in a rectangular sectional shape for the purpose of facilitating a machining work thereon, the edge lines of the groove do not have to be straight but may be hyperbolic lines, elliptic lines or other curved lines, polygonal lines or a combination of them.

The embodiments described are arranged on the assumption of the use of a flexible magnetic disc which measures about 45 mm in diameter having a plastic center core of about 15 mm in the middle part thereof and is called a video floppy disc. However, the flexible recording medium usable for the apparatus according to this invention is not limited to the magnetic disc of that kind. As described in detail in the foregoing, the fifth to eighth embodiments are capable of stably and adequately keeping the confronting condition between the head and the flexible disc at every shifted position of the head despite of the simple arrangement. In addition to that, the possibility of having the stabilizer member and the disc damaged can be lessened to a great degree. The arrangement of these embodiments is therefore extremely advantageous for a recording or reproducing apparatus using a flexible disc as a recording medium.

Figure 13A:
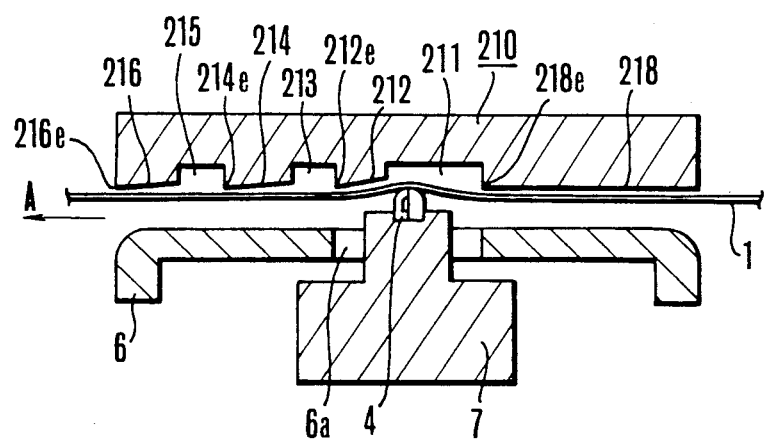
FIG. 13A is a sectional view showing a relation between a stabilizer plate and a record bearing medium obtained in a recording or reproducing apparatus arranged as a ninth embodiment of this invention.
Figure 13B:
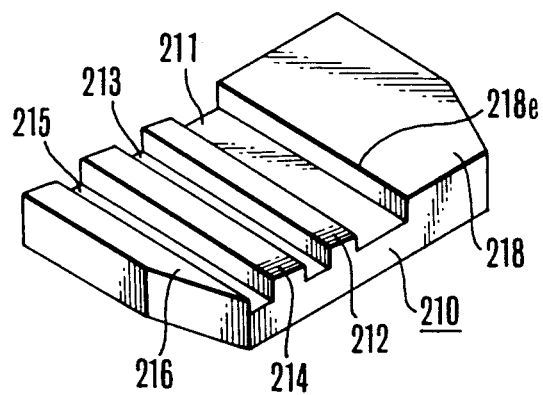
FIG. 13B is an oblique view of the stabilizer plate of FIG. 13A showing it as viewed from below.

FIGS. 13A and 13B show a ninth embodiment of this invention. The recording or reproducing apparatus in this case is provided with a stabilizer plate 210 the details of which will be described later herein. Reference numerals 1, 4, 6 and 7 denote the same elements as those shown in FIGS. 1 to 12. The stabilizer plate 210 has a recessed part 211 which is provided approximately in the middle of the plate 210 for the purpose of escaping the head 4. The recessed part 211 is of sufficiently large depth and width for keeping this part at about the same pressure as ambient pressure. On the downstream side of the recessed part 211 are arranged other recessed parts 213 and 215. These recessed parts 213 and 215 are also arranged in such a shape that keeps them under pressure about equal to the ambient pressure. Protrudent parts 212, 214 and 216 are divided by these recessed parts. The heights of the disc confronting faces of these protrudent parts are arranged to gradually lower according as they are located closer to the downstream end of the stabilizer plate 210 with each of their disc confronting faces arranged aslant in that direction. In FIG. 13B, these slanting disc confronting faces of the protrudent parts are shown as upper surfaces. As for the angle of inclination of the disc confronting face of each of these protrudent parts in relation to the standard rotation plane of the disc 1, i.e. their angles to a plane orthogonally intersecting the rotation axis of a disc rotating motor which is not shown, the angle of the protrudent part 212 is the largest; that of the protrudent part 214 is next; and that of the protrudent part 216 is the smallest. Their slanting angles relative to the standard rotation plane thus gradually decreases according as the downstream distance from the recessed goove part 211 increases. The reason for this arrangement is as follows: Under its rotating condition, the angle of inclination of the disc 1 increases according as it comes closer to a point of contact with the head 4 as shown in FIG. 13A. Therefore, in order to have sufficient positive pressure generated between the disc 1 and each of the slanting faces of these protrudent parts, each of these slanting faces must have the smallest gap between it and the disc 1 at its edge 212e, 214e or 216e and, meanwhile, a required degree of gap must be maintained between the disc 1 and the whole of the slanting face of each of the protrudent parts in such a way as to have the gap virtually formed at an acute angle (or into a wedge shape). The edges 212e, 214e and 216e are preferably arranged to be on the same plane. It is also preferable to have the disc confronting face of a protrudent part 218 which is disposed on the upstream side of the recessed groove part 211 also arranged to be on the same plane. However, referring to FIG. 13B, the heights of the edges 212e, 214e and 216e of the protrudent parts 212, 214 and 216 may be arranged to decrease according as their downstream distances are greater from the recessed groove part 211.

In this specific embodiment, the upstream side protrudent part 218 has its disc confronting face not arranged aslant and is arranged to be in parallel with the above-stated standard rotation plane Further, the head 4 is preferably arranged to come into sliding contact with the disc 1 at about middle point between the edge 218e of the upstream side protrudent part 218 and the edge 212e of the downstream side protrudent part 212. This point does not coincide with the center of the middle recessed part 211. This arrangement is necessary for allowing the slanting face of the downstream side protrudent part 212 to have a necessary shape and length for generating a required amount of positive pressure between it and the disc 1. Further, the term "sliding contact" as used herein means a contact state between the disc 1 and the head and includes cases where some slight gap may be brought about between them by the high speed rotation of the disc 1.

Next, when the magnetic disc 1 rotates, an air stream is developed between the stabilizer plate 210 which is arranged as described above and the magnetic disc. With the air stream thus obtained, the apparatus of FIG. 13A operates as follows: While the disc 1 is rotating, the head 4 is in sliding contact with the disc 1. The gap between the disc 1 and the upstream side protrudent part 218 gradually comes to decrease according as the length of the part 218 in the downstream direction increases and becomes a smallest gap at the edge 218e Then, the air stream which flows through this wedge shaped gap comes to produce positive pressure. The positive pressure pushes the disc 1 downward toward the back plate 6. The recessed groove part 211 which is provided for escaping from the head has a sufficiently large gap between the disc 1 to be kept under ambient pressure. The recessed part 211, therefore, remains almost completely unaffected by the external force of the air stream. Further, the recessed part 211 is of such a shape (depth and width) that no negative pressure will be generated there. At the protrudent part 212 on the downstream side of the stabilizer plate, the gap between the disc and the part 212 becomes the smallest at the edge 212e and the gap is also formed in a wedge-like shape. The air stream flowing there produces positive pressure. The recessed part 213 which follows the part 212 is kept under the ambient pressure in the same manner as the recessed part 211. Therefore, no negative pressure will be generated there. The protrudent parts 214 and 216 and the recessed part 215 which are further on the downstream side are also under about the same pressure condition as the condition described above.

Therefore, the disc 1 is pushed down toward the back plate 6 by the positive pressure generated at these protrudent parts 212, 214 and 216 one after another.

The magnetic disc 1 is thus pushed down toward the back plate 6 while no negative pressure is produced neither on the upstream side not on the down stream side of the stabilizer plate 210. The shape of the magnetic disc 1 under its rotating condition thus becomes symmetrical across its contact point with the magnetic head 4. The magnetic disc 1 is thus prevented from coming into contact with the stabilizer plate 210 with only excessive pressure.

Figure 14:
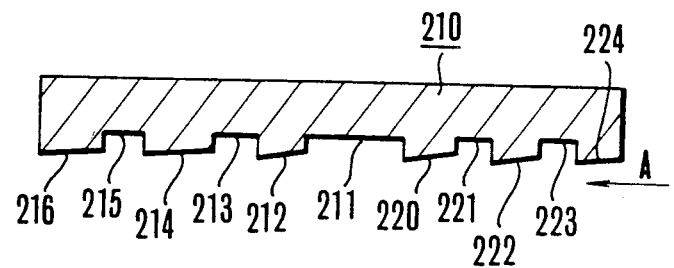
FIGS. 14 and 15 are sectional views showing stabilizer plates employed in recording or reproducing apparatuses arranged as tenth and eleventh embodiments of this invention.

In a recording or reproducing apparatus which is arranged according to this invention as a tenth embodiment thereof as shown in FIG. 14, a stabilizer plate 210 is provided with recessed parts 221 and 223 and protrudent parts 220, 222 and 224 also on the upstream side of a middle recessed part 211 as well as on the downstream side thereof. The shape and the function of the recessed parts 221 and 223 are similar to those of the downstream side recessed parts 213, etc. which are described in the foregoing with reference to FIGS. 13A and 13B. The protrudent parts 220 and 222 are arranged to have their magnetic disc confronting faces arranged to be slanting in the downstream direction. Under the rotating condition of the magnetic disc which is not shown, they form virtually wedge-shaped gaps between the disc in the same manner as the downstream side protrudent parts 212, etc. They are thus arranged to keep positive pressure between the disc and each of them at a required magnitude.

Figure 15:
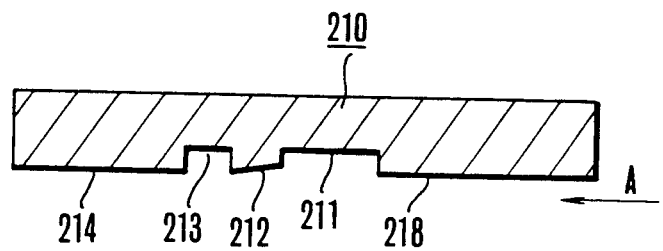

FIG. 15 shows an eleventh embodiment of this invention. In this case, two protrudent parts 212 and 214 are arranged on the downstream side and divided by one recessed part 213. Of these protrudent parts, the magnetic disc confronting face of te protrudent part 212 is alone arranged aslant. In cases where sufficient positive pressure is obtainable at every protrudent part with only a part of them arranged aslant like in the case of this embodiment, it is unnecessary to arrange other protrudent parts aslant including those on the upstream side. The number of the protrudent parts may be just two like this embodiment or may be four or more.

In each of the ninth, tenth and eleventh embodiments, the recessed part which is disposed approximately in the middle of the stabilizer plate and the recessed part on the downstream side of the middle recessed part can be kept under pressure which is approximately equal to the ambient pressure under the flexible recording medium rotating condition. Meanwhile, positive pressure is generated in between the recording (or record bearing) medium and the medium confronting faces of the protrudent parts divided by these recessed parts. All these recessed and protrudent parts are arranged to produce no negative pressure under the medium rotating condition. During its rotation, therefore, the recording medium is pushed downward away from the stabilizer plate both on the upstream and downstream sides of the sliding contact point between the medium and the recording or reproducing head and thus can be kept in a symmetrically deformed shape. Therefore, the head can be kept in sliding contact with the medium in a further stabilized manner.

Figure 16:
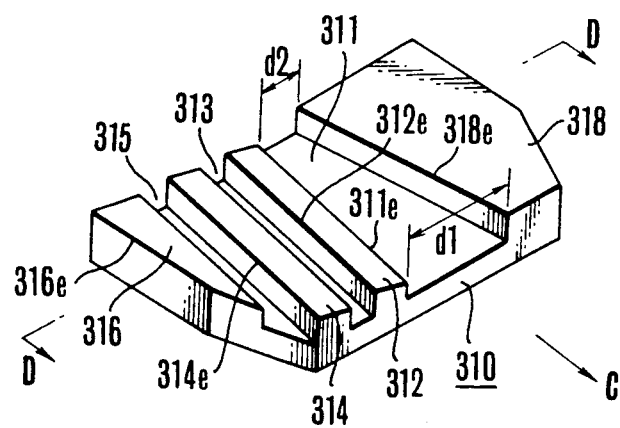
FIG. 16 is an oblique view of a stabilizer plate employed in a twelfth embodiment of this invention showing it as viewed from its disc confronting side.

FIG. 16 shows a twelfth embodiment of this invention. The embodiment is provided with a stabilizer plate 310. The illustration obliquely shows the plate 310 as viewed from the medium or disc confronting side. A recessed part 311 is provided approximately in the middle part of the stabilizer plate 310 for the purpose of avoiding collision with the head 4. The middle recessed part 311 is sufficiently large in depth and width for keeping this part under pressure about equal to the ambient pressure under the medium or disc rotating condition. As shown in FIG. 16, the recessed part 311 has a wider opening width d1 on the inner side of the center of the disc than an opening width d2 on the peripheral side of the disc. Recessed parts 313 and 315 are arranged one after the other on the downstream side of recessed part 311. Each of these downstream side recessed parts 313 and 315 has an unvarying opening width. However, they are also in such a shape that keeps them under pressure about equal to the ambient pressure when the disc 1 is rotating. Protrudent parts 312, 314 and 316 are divided by these recessed parts. The magnetic disc confronting face of each of these protrudent parts is arranged aslant. As regards the angles of inclination of these slanting faces relative to the standard rotation plane of the disc 1, that is, relative to a plane orthogonally intersecting the rotation axis of a disc rotating motor which is not shown, the disc confronting face of the protrudent part 312 is the largest, that of the protrudent part 314 is next and that of the protrudent part 316 is the smallest. The reason for this arrangement is as follows: In its rotating condition, the slanting angle of the deformed shape of the disc 1 becomes larger according as it is nearer to the sliding contact point with the head 4 as shown in FIG. 13A. Meanwhile, for the purpose of having a required amount of positive pressure between the slanting face of each protrudent part and the disc, the gap between the disc 1 and each of these protrudent parts 312, 314 and 316 is arranged to become the smallest gap at its edge 312e, 314e or 316e. Also, the gap must be kept in a required size throughout the whole slanting face of each of these protrudent parts. Therefore, these gaps are arranged to be virtually in a wedge-like shape. It is preferable to have the edges 312e, 314e and 316e on the same plane. Further, the disc confronting face of a protrudent part 318 which is disposed on the upstream side of the middle recessed part 311 is also preferably arranged to be on the same plane. However, the height of these edges 312e, 314e and 316e may be arranged to come closer to the disc 1 according as they locate further in the downstream direction instead of arranging them on the same plane.

In this specific embodiment, the disc confronting face of the upstream side protrudent part 318 is not arranged aslant but is in parallel with the above-stated standard rotation plane of the disc 1. Further, the sliding contact point between the head 4 and the disc 1 is preferably arranged to be approximately in the middle part between the edge 318e of the upstream side protrudent part 318 and the edge 312e of the downstream side protrudent part 312. Thus, the sliding contact point does not coincide with the center of the middle recessed part 311. This is necessary for allowing the slanting face of the downstream side protrudent part 312 to have a suitable shape and length required for generating a required amount of positive pressure between the disc 1 and the slanting face. Further, in FIG. 16, an arrow C indicates the direction in which the center core 2 of the disc 1 is located.

With the stabilizer plate 310 used for the recording or reproducing apparatus which is arranged as shown in FIG. 13A, an air stream fairly uniformly takes place throughout the whole space in between the stabilizer plate 310 and the disc 1 by virtue of the shape of the recessed part 311 which is formed approximately according to the shape 1a of deformation of the disc 1 caused by the protrudent state of the head 4 for the purpose of avoiding collision with the head 4. The uniform air stream ensures quite an adequate sliding contact condition between the head 4 and the disc 1 at every shifted position of the head 4.

In the case of this embodiment, the protrudent parts 312, 314 and 316 are arranged in parallel with the edge line 311e of the recessed part 311. Therefore, their positions relative to the disc 1 are as indicated by a broken line in FIG. 10A. The air stream produced by the rotation of the disc 1 has its component increasing in the direction from a tangential line of the disc to the outside due to a centrifugal force as indicated by an arrow E. The protrudent parts 312, 314 and 316 thus bear a nearly orthogonal relation to the direction E of the air stream. Therefore, the slanting faces of these protrudent parts 312, 314 and 316 efficiently give a sufficient amount of positive pressure.

Further, in the twelfth embodiment shown in FIG. 16, a sectional shape thereof taken along a line D—D may be arranged as shown in FIG. 14 or FIG. 15. In orther words, some protrudent and recessed parts may be arranged also on the upstream side of the recessed part 311 as well as on the downstream side as shown in FIG. 14; or two protrudent parts which are divided by one recessed part may be arranged on the downstream side in a manner as shown in FIG. 15. In the event of such modification, the recessed part 311 which is provided in the middle of the stabilizer plate 310 for the purpose of avoiding collision with the head must be in the same uneven opening shape relative to the disc 1 in the same manner as in the stabilizer plate of FIG. 16. In the above-stated modification, the grooves formed by the protrudent and recessed parts on the upstream side are arranged along the direction of the edge 318e of the recessed part 311 on the upstream side thereof. Th grooves formed by the protrudent and recessed parts on the downstream side are arranged along the direction of the downstream side edge 311e of the middle recessed part 311.

In the twelfth embodiment, the shape of the recessed part 311 may be either determined on the basis of the shape of deformation of the disc 1 obtained when the head 4 is positioned near the middle part of the recording area on the disc 1 as indicated by a reference numeral 4' in FIG. 10A or determined on the basis of an average of deformed shapes of the disc 1 obtained at different shifted positions of the head 4. The depth of the groove of the recessed part 311 may be determined as desired at any value that keeps the recessed part 311 under ambient pressure. Further, the recessed part 311 is in a rectangular sectional shape and is arranged to have straight edge lines of its groove for the purpose of facilitating machining work on the recessed part 311. The edge lines of the groove, however, do not have to be straight but may be some curved lines such as hyperbolic lines, elliptic lines, etc. or polygonal lines or a combination of such lines.

Figure 17A:
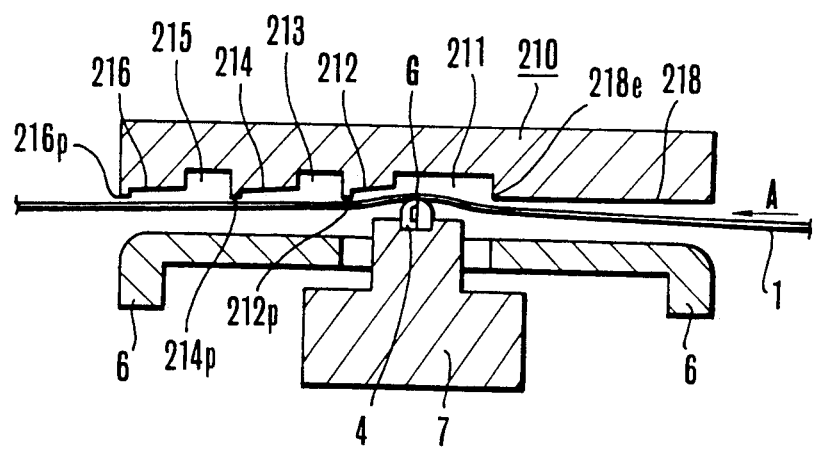
FIG. 17A is a sectional view showing a relation between a stabilizer plate and a record bearing medium obtained in a recording or reproducing apparatus arranged as a thirteenth embodiment of this invention.
Figure 17B:
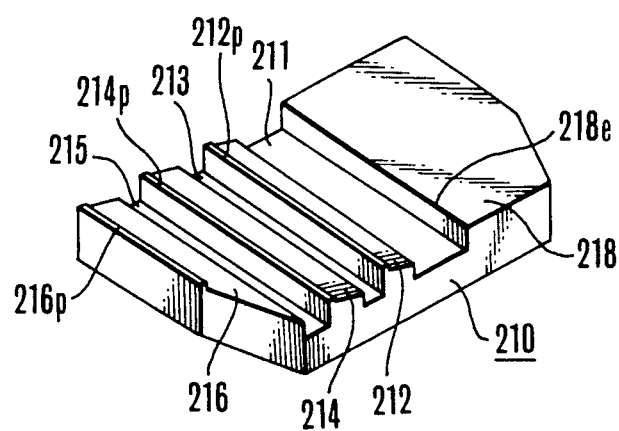
FIG. 17B is an oblique view of the stabilizer plate of FIG. 17A showing it as viewed from below.

A thirteenth embodiment of this invention is a recording or reproducing apparatus arranged as shown in FIGS. 17A and 17B. FIG. 17A shows in a sectional view a relation between the stabilizer plate of this embodiment and a record bearing medium or a disc. FIG. 17B is an oblique view of the stabilizer plate showing it as viewed from below. In these drawings, the same elements as those shown in FIGS. 13A and 13B are indicated by the same reference numerals. In this embodiment, projections 212p, 214p and 216p are additionally formed on the slanting faces of the protrudent parts 212, 214 and 216 of the ninth embodiment shown in FIGS. 13A and 13B. These projections are located at the ends of these slanting faces on the downstream sides of them relative to the rotating direction of the magnetic disc 1 respectively. With the stabilizer plate 210 arranged in this manner, the following advantage is attainable: As seen in FIG. 17A, the angle of inclination of the disc 1 in its rotating condition increases according as it is nearer to the sliding contact point G with the head 4. Therefore, the gap between the disc 1 and each of these protrudent parts becomes the smallest at the projection 212p, 214p or 216p. The gap can be kept in a required size over the whole area of each of these slanting faces and can be substantially kept in a wedge-like shape. Then, by virtue of these projections 212p, 214p and 216p, positive pressure is obtainable without arranging these slanting faces to have a large angle of inclination. The fore end sides of these projections 212p, 214p and 216p may be arranged on the same plane; or may be arranged to have their height become lower according as they locate further on the downstream side.

The stabilizer plate 210 is provided with a protrudent part 218 which is located on the upstream side in the rotating direction of the magnetic disc 1. In this specific embodiment, the disc confronting face of the protrudent part 218 is not slanting and is arranged to be in parallel with the above-stated standard rotation plane. However, this disc confronting face may be arranged aslant to come closer to the disc 1 on the side of the middle recessed part 211 in the same manner as the protrudent parts on the downstream side. Further, a projection may be formed on the edge 218 of the protrudent part 218 on the side of the middle recessed part 211. Since the disc 1 presents a curved surface around the sliding contact point G with the head 4 in its rotating state, the gap between the protrudent part 218 and the disc 1 substantially becomes a wedge-like shape with the edge 218e located most close to the disc 1. The protrudent part 218 is preferably arranged to be lower than the protrudent parts 212, 214 and 216 which are located on the downstream side.

The disc contacting position G of the head 4 is preferably set approximately in the middle point between the edge 218e of the upstream side protrudent part 218 and the projection 212p of the downstream side protrudent part 212. The sliding contact position G thus does not coincide with the center of the middle recessed part 211. This is because the slant face of the downstream protrudent part 212 must be allowed to have a shape and a length necessary for generating a required amount of positive pressure between it and the disc 1.

With the apparatus arranged as shown in FIGS. 17A and 17B, an air stream is produced between the stabilizer plate 210 and the magnetic disc 1 when the latter rotates. The pressure distribution of this air stream is determined almost entirely by the shape of the gap or clearance left between the plate 210 and the disc 1.

The head 4 is slidingly in contact with the disc 1 while the latter is rotating. The gap between the disc 1 and the protrudent part 218 on the upstream side of the stabilizer plate 210 is gradually narrows in the downstream direction and is narrowest at the edge 218e. The air stream flowing through this wedge-like gap generates positive pressure to push the disc 1 downward toward a back plate 6. If a projection is formed on this edge 218e, it would increase the positive pressure to be generated there. At the recessed part 211 which is provided for avoiding collision with the head 4, there is left a sufficiently large gap to keep this part under pressure about equal to the ambient pressure. This part, therefore, leaves the disc 1 almost completely unaffected by the external force of the air stream. Further, the shape (depth and width) of the recessed part 211 is so arranged that no negative pressure is generated there.

On the downstream side of the stabilizer plate 210, the disc confronting face of the protrudent part 212 is arranged aslant to have a gap between the slant face and the disc 1 become the narrowest at its edge on the downstream side. The gap is thus in a wedge-like shape in a manner similar to the upstream protrudent part 218. Thus, the air stream flowing through this gap produces positive pressure. The positive pressure is increased by the provision of the projection 212p added to the downstream edge of the protrudent part 212. With this projection 212p thus arranged, a required amount of positive pressure is obtainable without much increasing the angle of inclination of the slant face. The recessed part 213 which follows the protrudent part 212 is arranged to be kept under pressure about equal to ambient pressure and to generate no negative pressure in the same manner as the recessed part 211. The protrudent parts 214 and 216 and the recessed part 215 which are located further on the downstream side are respectively arranged to be under the same pressure conditions as those mentioned above. Therefore, the disc 1 is pushed downward toward the back plate 6 by the positive pressure generated by the shape of the protrudent parts 212, 214 and 216 on the downstream side and enhanced by their projections 212p, 214p and 216p one after another.

Therefore, in the apparatus arranged as shown in FIGS. 17A and 17B, when the disc 1 rotates, the recessed part 211 which is formed approximately in the middle of the stabilizer plate 210 and the recessed parts 213 and 215 which are formed on the downstream side thereof are kept under pressure about equal to the ambient pressure. Meanwhile, the projections 212p, 214p and 216p are formed respectively on the disc confronting faces of the protrudent parts 212, 214 and 216, so that the positive pressure can be generated in a large magnitude by virtue of these projections. Further, under the disc rotating condition, all the recessed and protrudent parts do not generate any negative pressure. During its rotation, therefore, the disc 1 is pushed down away from the stabilizer plate 210 both on the downstream and upstream sides of the sliding contact position G of the head 4 and thus can be kept in an approximately symmetrical deformed shape.

In the recording or reproducing apparatus of the kind having a stabilizer plate, the thrust state of the head 4 deforms the disc 1 into a curved shape. Therefore, in order to have positive pressure generated on the downstream side of the head 4, the positive pressure generating faces must be arranged in accordance with this deformed shape of the disc 1. In this instance, however, if these positive pressure generating faces are to be continuous from one to another, negative pressure would be generated at such a continuing part or parts. Whereas, the apparatus of FIGS. 17A and 17B solves this problem by arranging parts corresponding to such continuing parts in the form of the recessed parts 213 and 215 which can be kept under pressure about equal to ambient pressure.

The advantageous effect attained by providing the projections protruding toward the disc 1 on the downstream side edges of the downstream side protrudent parts can be fundamentally likewise attained with the stabilizer plate variously otherwise arranged, including for example: A stabilizer plate having only one protrudent part on the downstream side; a stabilizer plate having a plurality of protrudent parts divided by recessed parts; a stabilizer plate having protrudent part or parts arranged also on the upstream side; and so on. Further, the advantageous effect can be attained likewise without forming the projection or the slant face on some of the protrudent parts.

In accordance with this invention, as mentioned in the foregoing, the recessed part which is formed approximately in the middle part of the stabilizer plate can be kept under pressure about equal to the ambient pressure while the flexible record bearing medium or disc is rotating. Each of the protrudent parts formed on the downstream side of the recessed part relative to the rotating direction of the medium is arranged to have a projection formed on the slant face thereof. This arrangement enhances the positive pressure produced in the gap in between the medium and the slant face. Therefore, during its rotation, the record bearing medium is pushed downward away from the stabilizer plate by the positive pressure both on the upstream side and the downstream side of the sliding contact position of the recording or reproducing head and is thus kept in an approximately symmetrical deformed shape, so that the sliding contact condition between the medium and the head can be further stabilized.

Figure 18A:
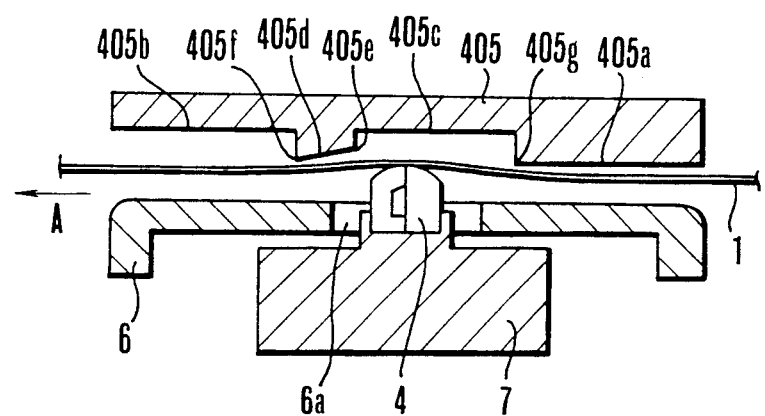
FIG. 18A is a sectional view showing the essential parts of a recording or reproducing apparatus arranged as a fourteenth embodiment of this invention.
Figure 18B:
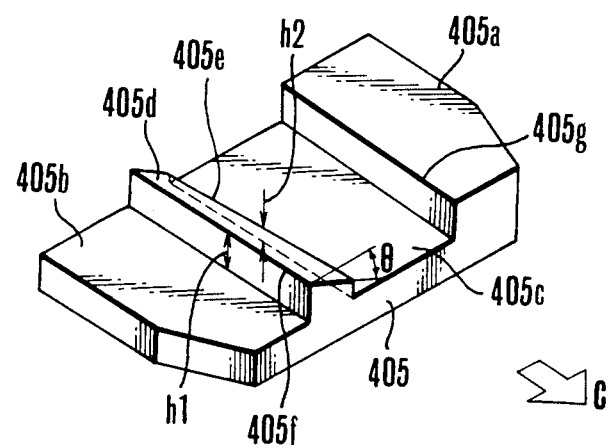
FIG. 18B is an oblique view showing from below the stabilizer plate of FIG. 18A.

FIGS. 18A and 18B show a fourteenth embodiment of this invention as applied to a recording or reproducing apparatus. FIG. 18A shows in a sectional view a stabilizer member in relation to a record bearing medium and a recording or reproducing head. FIG. 18B is an oblique view showing the stabilizer member or plate of FIG. 18A as viewed from below. In these drawings, the same elements as those shown in FIGS. 1 to 17 are indicated by the same reference numerals.

The stabilizer member 405 is provided with a recessed groove part 405c for escaping the head on its side confronting a disc 1 which is the record bearing medium mentioned above. The member 405 is divided by this recessed part 405c into a disc confronting face 405a which is on the upstream side of the recessed part 405c relative to the rotating direction of the disc 1 indicated by an arrow A in FIG. 18A and another disc confronting face 405b which is on the downstream side of the recessed part 405c. The downstream side disc confronting face 405b is provided with a positive pressure generating slant face 405d which adjoins the recessed groove part 405c as seen in FIG. 18B. A line 405e indicates the common edge line of the groove part 405 on its downstream side and the slant face 405d on the side of the groove part 405c. A line 405f indicates the edge of the slant face 405d on its downstream side. Of these edge lines, the height h1 of the edge line 405f from the downstream side disc confronting face 405b is unvarying. (In this specific embodiment the recessed groove part 405c and the confronting face 405b are assumed to be on the same level. However, they may be on different levels.) Meanwhile, the height h2 of the edge line 405e from the recessed groove part 405c is arranged to gradually increase either stepwise or continuously in the direction of arrow C in which the center core of the disc 1 is located. In other words, the angle $\theta$ of inclination of the slant face 405d is arranged to become smaller in the direction of arrow C. As a whole, the slant face 405d thus presents a twisted state.

The angle θ of the slant face 405d is thus arranged to provide a required acute angle in the rotating direction of the disc 1 for generating required positive pressure in between the slant face 405d and a portion of the disc 1 passing by this part when the disc 1 rotates in the direction of arrow. In other words, the angle θ is determined in such a manner that an acute angle can be formed for obtaining a necessary magnitude of positive pressure when the disc 1 rotates at a given speed.

In the case of FIGS. 18A and 18B, the slant face 405d adjoins the recessed groove part 405c. However, the slant face 405d may be arranged at a short distance away from the edge line 405c of the recessed groove part 405d on the downstream side instead of immediately adjoining the latter.

The sliding contact position between the head 4 and the disc 1 is preferably set approximately in the middle point between the edge line 405g of the upstream side disc confronting face 405a and the edge line 405f of the downstream slant face 405d. The sliding contact position thus does not coincide with the center of the recessed groove part 405c. This arrangement is required for allowing the downstream side slant face 405d to have a necessary shape and a necessary length for generating a required magnitude of positive pressure in between the slant face 405d and the disc 1.

Figure 19A:
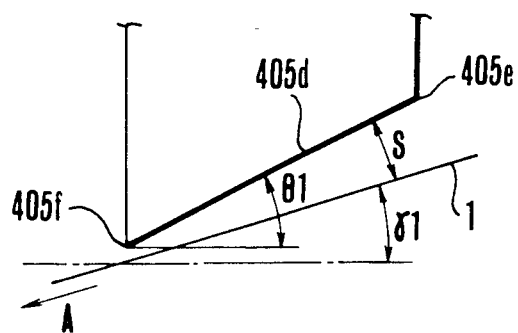
FIGS. 19A and 19B enlarged views showing the relative slanting states of the stabilizer plate and the rotating record bearing medium shown in FIGS. 18A and 18B.
Figure 19B:
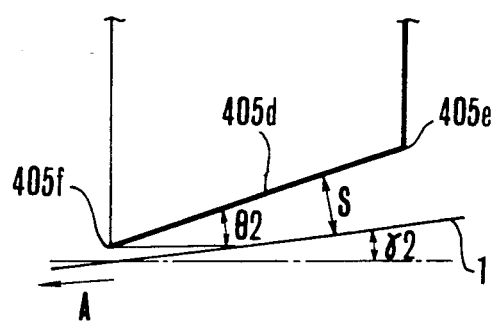

The operation of the embodiment which is arranged as described above is as follows: When the disc 1 rotates at a high speed, positive pressure is normally generated in between the disc 1 and the upstream side disc confronting face 405a of the stabilizer member. The positive pressure then acts to push the disc 1 downward as viewed on FIG. 18A. Meanwhile, under the high speed rotating condition of the disc 1, positive pressure is generated between the slant face 405d and the disc 1 while the head 4 is thrusting forward toward the recessed groove part 405c. This positive pressure pushes down the disc 1 away from the downstream side disc confronting face 405b. Referring to FIGS. 19A and 19B, the shape of a gap S which is formed in between the disc 1 and the slant face 405d as shown in these drawings determines the magnitude of the positive pressure generated on the slant face 405d. When the disc 1 is rotating at a high speed, a relative inclining condition is obtained between the disc 1 and the slant face 405d as shown in FIGS. 19A and 19B. FIG. 19A shows the condition obtained in an area in the neighborhood of the outer circumference of the disc 1 while FIG. 19B shows the condition obtained in an area in the neighborhood of the inner circumference of the disc 1. An angle γ1 between a horizontal plane and the disc 1 on the outer circumferential side of the latter is larger than an angle γ2 between the horizontal plane and the disc 1 on the inner circumferential side due to the influence of the center core of the disc 1. Whereas, the angle θ of inclination of the slant face 405d is arranged to decrease in the direction of the inner circumference of the disc 1. Therefore, referring to FIGS. 19A and 19B, an angle θ2 is smaller than an angle θ1. Accordingly, the gap space S which is left in a wedge-like shape in between the disc 1 and the slant face 405d becomes almost unvarying all over the disc 1 from the outer circumference to the inner circumference thereof. In this instance, the magnitude of the positive pressure generated in the gap space S in between the disc 1 and the slant face 405d depends on the angle of the wedge-like shape of the gap space S obtained in the direction of arrow A indicated in FIGS. 19A and 19B. The positive pressure reaches the largest magnitude when the opening angle between the disc and the slant face 405d is nearly zero while the disc 1 is rotating at a high speed. The magnitude of the positive pressure decreases according as the opening angle between the slant face 405d and the fast rotating disc 1 increases. Therefore, with the slant face 405d arranged as shown in FIG. 18B, the slant face 405d is always at an angle of inclination suited for the deformed shape of the fast orating disc 1 at any sectional point in the direction of arrow C shown in FIG. 18B. Accordingly, the force of the positive pressure which is generated in the gap space S can be fairly uniformly distributed over the whole area of the disc 1 from the outer circumference to the inner circumference thereof. Besides, the slant face can be arranged to generate the positive pressure in a great magnitude.

With the slant face 405d arranged as described above, the positive pressure which is generated thereby does not drop to any tangible degree on the inner circumferential side of the disc 1 and gives almost uniform pressure distribution in the direction of arrow C. The disc 1 is, therefore, effectively pushed down away from the downstream side disc confronting face 405b. This precludes the possibility of having the disc 1 come into contact with the stabilizer member 405. The sliding contact between the head 4 and the disc 1 can be improved to a great degree. This prevents any uneven rotation of the disc 1 that otherwise results from the contact of the disc 1 with the stabilizer member 405.

Figure 20:
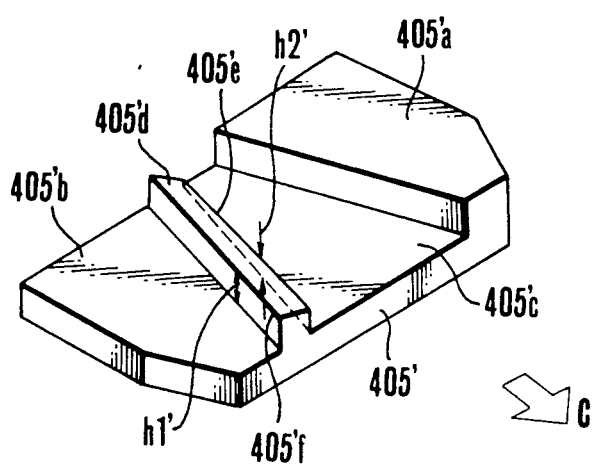
FIG. 20 is an oblique view of a stablizer member employed in a recording or reproducing apparatus arranged as a fifteenth embodiment of this invention showing it as viewed from below.

FIG. 20 shows in an oblique view a stabilizer member employed in a recording or reproducing apparatus arranged as a fifteenth embodiment of this invention. The stabilizer member 405' is shown in a state as viewed from below. In this case, the position of the head 4 and that of the disc 1 relative to each other is almost identical with the embodiment shown in FIG. 18A. While the head escaping recessed groove part 405c of FIGS. 18A and 18B is arranged in a rectangular shape, a recessed groove part 405'c which is provided in this case for the same purpose is arranged in a trapezoidal shape gradually widening in the direction of arrow C. The disc 1 is deformed when it rotates at a high speed as mentioned in the foregoing with reference to FIGS. 10A and 10B. The angle γ formed between a horizontal plane and the deformed portion of the disc 1 which confront a slant face 405'd when it rotates at a high speed is smaller on the inner side of the disc 1 than on the outer side thereof. Therefore, the arrangement of the embodiment shown in FIG. 20 gives a greater advantageous effect in terms of obtaining uniform pressure distribution in the direction of arrow C shown in FIG. 20. The embodiment is thus based on the concept of arranging the angle of a positive pressure generating slant face relative to the standard rotation plane or horizontal plane to gradually increase in the direction from the inner side to the outer side of the disc. This concept is of course likewise applicable to the first to thirteenth embodiments.

In the embodiment described above, the stabilizer member is provided with the positive pressure generating slant face which has its angle of inclination vary in the shifting direction of the head and is arranged on the downstream side of the recessed groove part relative to the rotating direction of the record bearing medium while the recessed groove part is arranged to confront the recording or reproducing head across the record bearing medium. Therefore, the positive pressure generated in between the slant face and the medium can be almost uniformly distributed over the whole area corresponding to the deformed shape of the record bearing medium obtained when the medium rotates at a high speed and this uniform positive pressure distribution is obtainable at every shifted position of the head. Besides, the pressure generated on the inner side of the medium seldom drops. Therefore, the record bearing medium can be stably and evenly rotated without causing it to come into contact with the stabilizer member. The embodiment is thus capable of stabilizing the sliding contact between the recording or reproducing head and the record bearing medium while the medium is rotating.

What is claimed is:

1. A recording or reproducing apparatus using a rotating flexible disc with stabilizing means, having a recording or reproducing head and a stabilizing member, confronting each other on opposite sides of the disc so as to sandwich the disc, said recording or reproducing head shiftable in the radial direction of the flexible disc, and said stabilizing member being arranged at a position opposite to said disc wherein a surface of said stabilizing member opposing to said disc is formed so as to constitute a plane close to and parallel with the surface of said disc and said surface opposing to the disc is provided with a recessed groove part, inside which an atmospheric pressure is maintained, arranged along the shifting passage of said head in the radial direction of the disc, said recessed groove part having a uniform depth at an inner circumferential side and an outer circumferential side of said disc, further an inclined surface is formed over an entire area of said recessed groove part in its lengthwise direction for generating an air pressure for pressing said rotating flexible disc toward said head and said inclined surface is formed at an edge portion of said recessed groove part of said stabilizing member constituting a downstream side of said recessed groove part relative to the rotating direction of said disc, said inclined surface being constructed so that its inclining angle relative to said rotating direction of said disc varies in the radial direction of said disc.

2. An apparatus according to claim 1, wherein said stabilizing member has a plurality of inclined surfaces thereon on the downstream side of said recessed groove spaced from each other relative to the rotating direction of said disc, each of said inclined surfaces generating a positive air pressure for pressing the rotating disc toward said head.

3. An apparatus according to claim 2, wherein said plurality of inclined surfaces are spaced, respectively, by recessed groove parts.

4. An apparatus according to claim 2, wherein at least some of said plurality of inclined surfaces differ from each other in the angle of inclination.

5. An apparatus according to claim 1, whrein, in a portion of said inclined surface, there is provided a protruding part which extends along said recessed groove part in the longitudinal direction of the latter.

6. A recording or reproducing apparatus using a rotating flexible record bearing medium, having a recording or reproducing head and a stabilizing plate for stabilizing the rotating motion of said flexible record bearing medium, said head and said stabilizing plate confronting each other on opposite sides of the medium so as to sandwich the medium, wherein said stabilizing plate has a surface opposing the medium which is disposed close to and parallel with a surface of the medium, and said stabilizing plate comprises a recessed groove part formed approximately in the middle part of said plate opposite to the shifting passage of said head and kept under a pressure approximately equal to ambient pressure therein while said record bearing medium is rotating;

at least one recessed part, on the downstream side of said middle recessed groove part relative to the rotating direction of said medium, kept under a pressure approximately equal to the ambient pressure while said medium is rotating; and a slant part of said stabilizing plate between said recessed parts arranged so as to generate a positive air pressure for pressing said medium toward said head in between said slant part and said record bearing medium while said medium is rotating.

7. An apparatus according to claim 6, wherein said upper part has the medium confronting face thereof arranged at an incline.

8. A recording or reproducing apparatus using a rotating flexible record bearing medium having a recording or reproducing head and a stabilizing plate for stabilizing the rotating motion of said flexible record bearing medium relative to said head, said head and said stabilizing member confronting each other on opposite sides of the medium to thereby sandwich the medium, wherein said stabilizing plate has a surface opposing the medium which is disposed close to and parallel with a surface of the medium, and said stabilizing plate comprises:

a middle recessed part formed on said surface of said stabilizing plate and approximately in the middle part of said plate opposite to the shifting passage of said head, and said middle recessed part having a wider opening width in the inner side of said disc than on the outer side thereof and said recessed part being kept under pressure about equal to ambient pressure while said record bearing medium is rotating;

at least one recessed part formed on said surface of said stabilizing plate which is disposed on the downstream side of said middle recessed part relative to the rotating direction of said medium and also kept under pressure about equal to the ambient pressure while said medium is rotating; and a portion of said stabilizing plate between said recessed parts generating pressure, for pressing said medium toward said head, in between said portion and said record bearing medium while said medium is rotating.

9. An apparatus according to claim 8, wherein said portions has the medium confronting face thereof arranged at an incline.

10. A recording or reproducing apparatus using a rotating flexible record bearing medium having a recording or reproducing head and a stabilizing plate for stabilizing the rotating motion of the flexible record bearing medium relative to said head, wherein said stabilizing plate has a surface opposing the medium which is disposed close to and parallel with a surface of the medium, said head and said stabilizing plate confronting each other on opposite sides of the medium so as to sandwich the medium, wherein said stabilizing plate comprises:

a middle recessed part formed on said surface of said stabilizing plate which is approximately in the middle part of said plate opposite to the shifting passage of the recording or reproducing head and to keep said recessed part under pressure about equal to ambient pressure while said record bearing medium is rotating; and at least one inclined surface formed on said surface of said stabilizing plate and further formed, on the downstream side of said middle recessed part relative to the rotating direction of said medium generating a positive air pressure to press said medium toward said head, said inclined surface gradually coming closer to said medium in the downstream direction relative to said rotation, and a projecting member protruding toward said medium at one end of said inclined surface which is closest to said medium.

11. A recording or reproducing apparatus comprising:

a recording or reproducing head which is shiftable in the radial direction of a flexible record bearing medium; and a stabilizing member having a surface opposed and in a close, parallel relation to a surface of the record bearing medium, said head and said stabilizing member confronting each other on opposite sides of the record bearing medium to thereby sandwich the record bearing member, said surface being provided with a recessed groove part which is arranged at a position opposite to said head across said medium, said stabilizing member further having an inclined surface for generating a positive pressure to press said medium toward said head while said medium is rotating, said inclined surface being arranged at an edge portion of said recessed groove part opposite to said medium and on the downstream side thereof relative to the rotating direction and to have the angle of inclination vary in the shifting direction of said head.

12. A recording or reproducing apparatus using a rotating flexible disc having a recording or reproducing head which is shiftable in the radial direction of said flexible disc and a stabilizing member which is arranged in a position opposite to said head across said disc, said head and said stabilizing member confronting each other on opposite sides of the disc to thereby sandwich the disc, wherein a surface of said stabilizing member opposing to said disc is formed so as to constitute a plane close to and parallel with said disc surface and said surface opposing to the disc is provided with a recessed groove part, inside which an atmosphere pressure is maintained, arranged along the shifting passage of said head, wherein said recessed groove part is formed to have a wider opening width on the inner side of said disc than on the outer side thereof, and said recessed groove part has a uniform depth at an outer circumferential side and an inner circumferential side of said disc, further, an inclined surface, for generating a positive air pressure for pressing the rotating flexible disc toward said head, is formed over an entire area of said recessed groove part in its lengthwise direction at the edge part of said recessed groove part constituting the downstream side of said recessed groove part of said stabilizing member relative to the rotating direction of said disc, said inclined surface being made up of a plurality of surfaces spaced in the downstream direction of rotation and having different inclining angles, respectively.

13. A recording or reproducing apparatus using a rotating flexible disc with stabilizing means, having a recording or reproducing head and a stabilizing member confronting each other on opposite sides of the flexible disc so as to sandwich the disc, said head being shiftable in the radial direction of the flexible disc, and said stabilizing member which is arranged at a position opposite to said disc wherein a surface of said stabilizing member opposing to said disc is formed so as to constitute a plane close to and parallel with the surface of said disc and said surface opposing to the disc is provided with a recessed groove part, inside which an atmospheric pressure is maintained, arranged along the shifting passage of said head in the radial direction of the disc, said recessed groove part having a uniform depth at an inner circumferential side and an outer circumferential side of said disc, further, an inclined surface is formed over an entire area of said recessed groove part in its lengthwise direction for generating an air pressure for pressing said rotating flexible disc toward said head and said inclined surface is formed at an edge portion of said recessed groove part of said stabilizing member constituting a downstream side of said recessed groove part relative to the rotating direction of said disc, said inclined surface being arranged to have an angle of inclination thereof relative to a datum plane of said disc increasing according as said inclined surface is closer to the outer circumferential of said disc.

* * * * *

UNITED STATES PATENT AND TRADEMARK OFFICE
CERTIFICATE OF CORRECTION

PATENT NO. : 5,062,020

DATED : October 29, 1991

INVENTOR(S) : Eiji Osanai

It is certified that error appears in the above-identified patent and that said Letters Patent is hereby corrected as shown below:

On the title page:

[73] Assignee: Canon Kabushiki Kaisha
Ohta-ku, Tokyo, Japan

Signed and Sealed this

Eighth Day of June, 1993

Attest:

MICHAEL K. KIRK

Attesting Officer

Acting Commissioner of Patents and Trademarks